US011077550B2

(12) United States Patent
Yoshida et al.

(10) Patent No.: US 11,077,550 B2
(45) Date of Patent: Aug. 3, 2021

(54) INDUSTRIAL ROBOT (71) Applicant: KAWASAKI JUKOGYO KABUSHIKI KAISHA, Kobe (JP)

(72) Inventors: Tetsuya Yoshida, Kobe (JP); Masataka Tanabe, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 96 days.

(21) Appl. No.: 15/307,438

(22) PCT Filed: Mar. 31, 2015

(86) PCT No.: PCT/JP2015/060092
§ 371 (c)(1),
(2) Date: Oct. 28, 2016

(87) PCT Pub. No.: WO2015/166757
PCT Pub. Date: Nov. 5, 2015

(65) Prior Publication Data
US 2017/0050314 A1 Feb. 23, 2017

(30) Foreign Application Priority Data
Apr. 28, 2014 (JP) .............................. JP2014-092297

(51) Int. Cl.
B25J 19/00 (2006.01)
B25J 9/06 (2006.01)
(Continued)

(52) U.S. Cl.
CPC ............... *B25J 9/06* (2013.01); *B25J 9/1065* (2013.01); *B25J 19/0012* (2013.01);
(Continued)

(58) Field of Classification Search
CPC ... B25J 9/06; B25J 9/046; B25J 9/1065; B25J 19/00; B25J 19/0008; B25J 19/0016;
(Continued)

(56) References Cited

U.S. PATENT DOCUMENTS 4,460,148 A    7/1984  Sasaki
4,592,697 A *  6/1986  Tuda ........................ B25J 9/046
                                                             267/71

(Continued)

FOREIGN PATENT DOCUMENTS

EP    1 782 927 A2    5/2007
JP    S61-12691 U     1/1986
(Continued)

OTHER PUBLICATIONS

Jun. 23, 2015 International Search Report issued in International Patent Application No. PCT/JP2015/060092.
(Continued)

Primary Examiner — Jake Cook
Assistant Examiner — Gregory Robert Weber
(74) Attorney, Agent, or Firm — Oliff PLC (57) ABSTRACT A robot includes a lower arm mechanism having a first parallel link structure, an upper arm mechanism having a second parallel link structure, a base portion forming a lower side part of the first parallel link structure, a wrist portion forming a distal side part of the second parallel link structure, an intermediate connection portion forming an upper side part of the first parallel link structure and a proximal side part of the second parallel link structure, and an upper arm biasing unit for applying a biasing force against a rotating operation in a direction that the wrist portion descends to an upper arm configuring a lower side part of the second parallel link structure. According to the robot, the range of the portable mass of an object can be expanded (Continued)

without enlarging an arm drive motor and declining an arm operation speed.

10 Claims, 9 Drawing Sheets

(51) Int. Cl.
 *B25J 9/10* (2006.01)
 *B25J 9/16* (2006.01)
(52) U.S. Cl.
 CPC .......... *B25J 19/0016* (2013.01); *B25J 9/1687* (2013.01); *Y10S 901/48* (2013.01)
(58) Field of Classification Search
 CPC ........ B25J 19/002; B25J 9/047; B25J 9/1687; Y10S 901/48; B23P 19/007; B65G 47/91; B65G 47/90; B65H 67/065
 USPC .......................................................... 74/491
 See application file for complete search history.

(56) References Cited

U.S. PATENT DOCUMENTS

| | | | | |
|---|---|---|---|---|
| 5,314,291 | A * | 5/1994 | Ohashi | ................ B25J 19/0012 414/719 |
| 5,775,171 | A * | 7/1998 | Richter | .................... B25J 9/046 414/729 |
| 6,564,667 | B2 * | 5/2003 | Bayer | ................ B25J 19/0016 267/291 |
| 7,331,750 | B2 * | 2/2008 | Merz | ........................ B25J 9/104 74/490.01 |
| 7,673,536 | B2 * | 3/2010 | Tamura | .................... B25J 9/046 318/568.1 |
| 2006/0245894 | A1 | 11/2006 | Merz et al. | |
| 2013/0110128 | A1 * | 5/2013 | Schostek | ............ A61B 1/00158 606/130 |

FOREIGN PATENT DOCUMENTS

| | | | | |
|---|---|---|---|---|
| JP | H01-103699 | U | | 7/1989 |
| JP | H03-103181 | U | | 10/1991 |
| JP | H04-19092 | A | | 1/1992 |
| JP | H05-78100 | A | | 3/1993 |
| JP | H07-686 | U | | 1/1995 |
| JP | H07-108480 | A | | 4/1995 |
| JP | H07-227791 | A | | 8/1995 |
| JP | H10-180665 | A | | 7/1998 |
| JP | H11-262889 | A | | 9/1999 |
| JP | H11-262889 | A | * | 9/1999 |
| JP | 2003-039351 | A | | 2/2003 |
| JP | 2003-071759 | A | | 3/2003 |
| JP | 2004-001112 | | * | 1/2004 .............. B25J 17/00 |
| JP | 2004-001112 | A | | 1/2004 |
| JP | 2004001112 | A | * | 1/2004 |
| JP | 2004122297 | A | * | 4/2004 |
| JP | 2007-089465 | A | | 4/2007 |
| JP | 2008-142829 | A | | 6/2008 |
| JP | 2011-031372 | | * | 2/2011 ................ B25J 9/06 |
| JP | 2011-031372 | A | | 2/2011 |
| JP | 2011-125966 | A | | 6/2011 |
| JP | 2013-052494 | A | | 3/2013 |

OTHER PUBLICATIONS

Nov. 10, 2016 International Preliminary Report on Patentability issued in International Patent Application No. PCT/JP2015/060092.
Sep. 14, 2018 Office Action Issued in Japanese Patent Application No. 2014-092297.
Mar. 23, 2018 Search Report issued in European Patent Application No. 15786446.3.

* cited by examiner

INDUSTRIAL ROBOT

TECHNICAL FIELD

The present invention relates to an industrial robot, and more particularly, to an industrial robot comprising an arm mechanism having a parallel link structure.

BACKGROUND ART

Conventionally, industrial robots are installed in various factories for producing electric apparatus, machines, auto mobiles, and the like as a conveyance robot for conveying objects and a working robot for machining objects. The industrial robots include various types according to the use, and one of them is a robot comprising an arm mechanism having a parallel link structure (Patent Literature 1).

This type of robot comprises a lower arm mechanism having the parallel link structure, and an upper arm mechanism is connected to the lower arm mechanism. This robot has a feature that its lower arm mechanism has the parallel link structure, and therefore the posture of the upper arm mechanism does not change even when the lower arm configuring the lower arm mechanism performs an inclining operation.

By utilizing the feature, a wrist shaft can be maintained in a state of always facing downward regardless of the inclining operation of the lower arm, for example. Therefore, this type of robot is suitable for an operation that objects are held by an end effector which is mounted to a wrist portion and piled up on a pallet (palletizing operation).

Also, such palletizing robots include one that not only the lower arm mechanism but also the upper arm mechanism has the parallel link structure (Patent Literature 2).

CITATION LIST

Patent Literature

[Patent Literature 1] Japanese Patent Application Laid-Open No. 2003-39351
[Patent Literature 2] Japanese Patent Application Laid-Open No. 2011-31372

SUMMARY OF INVENTION

Technical Problem

However, in the above-mentioned conventional industrial robot, the range of mass of conveyable objects (portable mass) is respectively limited, and it is difficult that objects with different mass are handled by a single robot.

In order to raise the upper limit of the range of portable mass, increasing the capacity of a motor for driving an arm or increasing a reduction ratio upon conducting a motor drive force to the arm is taken into consideration. However, when the motor capacity is increased, the motor is enlarged and also costs are increased. Additionally, when the reduction ratio is increased, there will be a problem that a conveyance speed is decreased and working efficiency is reduced.

Solution to the Problem

The present invention was made considering the above-mentioned problems of the conventional art. An object of the present invention is to provide an industrial robot capable of expanding the range of the portable mass of an object without enlarging an arm drive motor and declining an arm operation speed.

In order to solve the above-mentioned problems, an industrial robot according to a first aspect of the present invention comprises a lower arm mechanism having a first parallel link structure, an upper arm mechanism having a second parallel link structure, a base portion forming a lower side part of the first parallel link structure, a wrist portion forming a distal side part of the second parallel link structure, an intermediate connection portion forming an upper side part of the first parallel link structure and a proximal side part of the second parallel link structure, and an upper arm biasing unit configured to apply a biasing force against a rotating operation in a direction that the wrist portion descends to an upper arm configuring a lower side part or an upper side part of the second parallel link structure.

The present invention according to a second aspect is that, in the present invention according to the first aspect, the upper arm has an arm extension portion extending exceeding a rotational axis of the upper arm on a proximal end side of the upper arm, and the upper arm biasing unit is configured so as to apply a biasing force to the arm extension portion.

The present invention according to a third aspect is that, in the present invention according to the second aspect, the biasing force of the upper arm biasing unit works in a direction that the arm extension portion is pressed in.

The present invention according to a fourth aspect is that, in the present invention according to the second aspect, the biasing force of the upper arm biasing unit works in a direction that the arm extension portion is attracted.

The present invention according to a fifth aspect is that, in the present invention according to any one of the first to fourth aspects, the upper arm biasing unit has a gas spring.

The present invention according to a sixth aspect is that, in the fifth aspect, the gas spring has a cylinder connected to the intermediate connection portion side and a piston connected to the arm extension portion side.

The present invention according to a seventh aspect is that, in the present invention according to any one of the first to sixth aspects, the upper arm biasing unit is configured detachably.

The present invention according to an eighth aspect is that, in the present invention according to any one of the first to seventh aspects, the upper arm biasing unit regularly applies a biasing force to the upper arm.

The present invention according to a ninth aspect is that, in the present invention according to any one of the first to eighth aspects, the upper arm to which the biasing force is applied by the upper arm biasing unit is an arm directly driven by a drive source.

The present invention according to a tenth aspect is that, in the present invention according to any one of the first to ninth aspects, the first parallel link structure has a first lower arm configuring a front side part thereof and a second lower arm configuring a rear side part thereof, the first lower arm and the second lower arm having a same strength against their torsion.

The present invention according to an eleventh aspect is that, in the present invention according to the tenth aspect, at least one of the first lower arm and the second lower arm is formed to have a hollow structure.

The present invention according to a twelfth aspect is that, in the present invention according to the tenth aspect or the eleventh aspect, one of the first lower arm and the second lower arm which is directly driven by a drive source is connected to the base portion to have a cantilever structure.

The present invention according to a thirteenth aspect is that, in the present invention according to any one of the first to twelfth aspects, a lower arm biasing unit configured to apply a biasing force against a forward inclining operation of the lower arm to a lower arm configuring a front side part or a rear side part of the first parallel link structure is further comprised.

The present invention according to a fourteenth aspect is that, in the present invention according to the thirteenth aspect, the first parallel link structure has a first lower arm configuring its front side part and a second lower arm configuring its rear side part, and the lower arm biasing unit applies a biasing force to one of the first lower arm and the second lower arm which is different from either one which is directly driven by a drive source.

The present invention according to a fifteenth aspect is that, in the present invention according to any one of the first to fourteenth aspects, the base portion is capable of rotating about a vertical axis line, the industrial robot having a pair of left and right drive sources for applying a rotational drive force to the base portion.

Advantageous Effects

According to the present invention, an industrial robot capable of enlarging the range of the portable mass of an object without enlargement of an arm drive motor and reduction in arm operation speed can be provided.

EMBODIMENT OF THE INVENTION

Hereunder, an industrial robot in accordance with an embodiment of the present invention will be described referring to the drawings.

Note that the robot in accordance with the embodiment which will be described hereunder has four drive axles (four-axle robot), being suitable for a palletizing robot used to place a plurality of objects on a palette, for example. However, a scope of application of an industrial robot according to the present invention is not limited to the palletizing robot and it can be widely applied to industrial robots comprising an arm mechanism having a parallel link structure.

Figure 1:
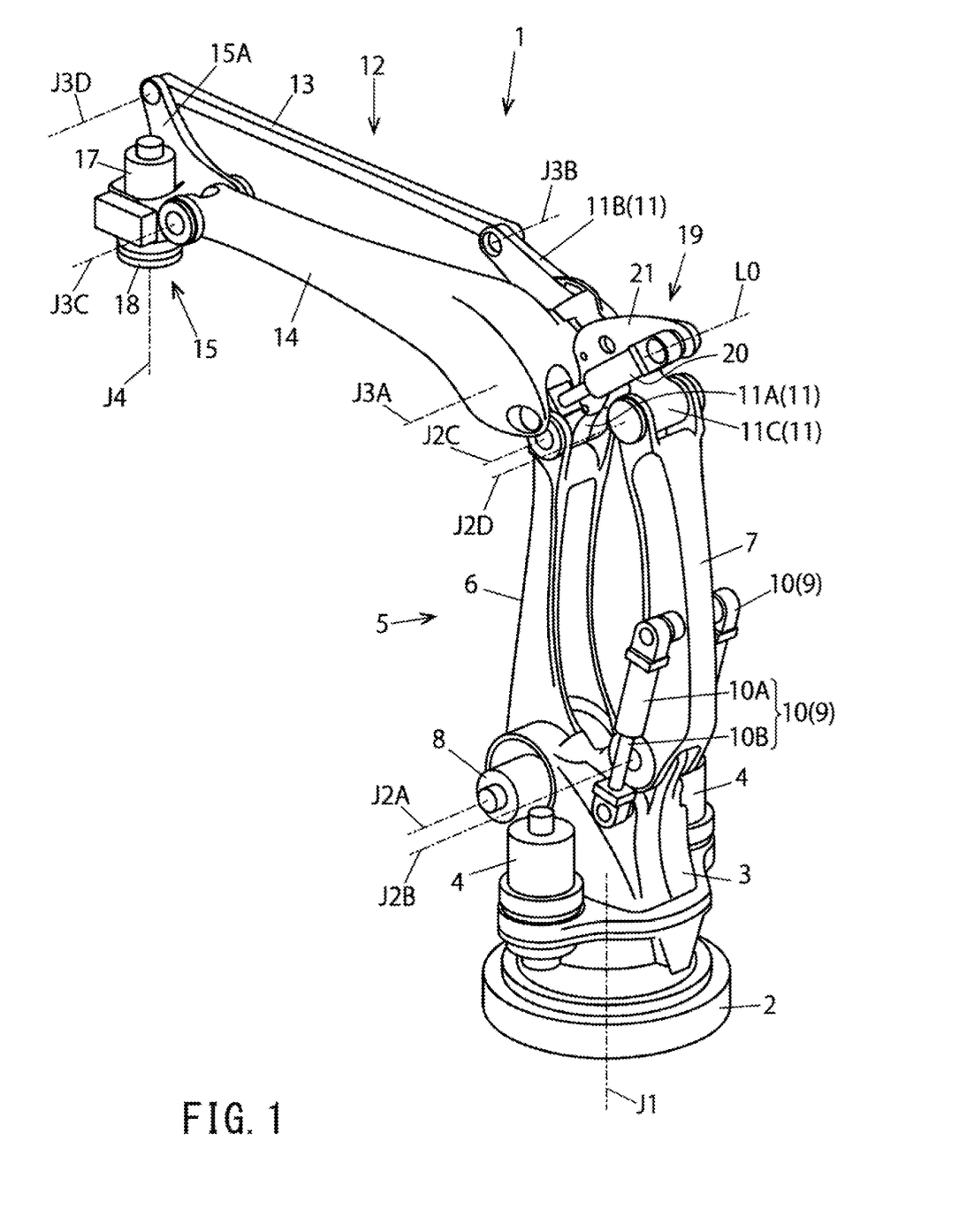
FIG. 1 is a perspective view of an industrial robot in accordance with an embodiment of the present invention in a view from the diagonal rear.
Figure 2:
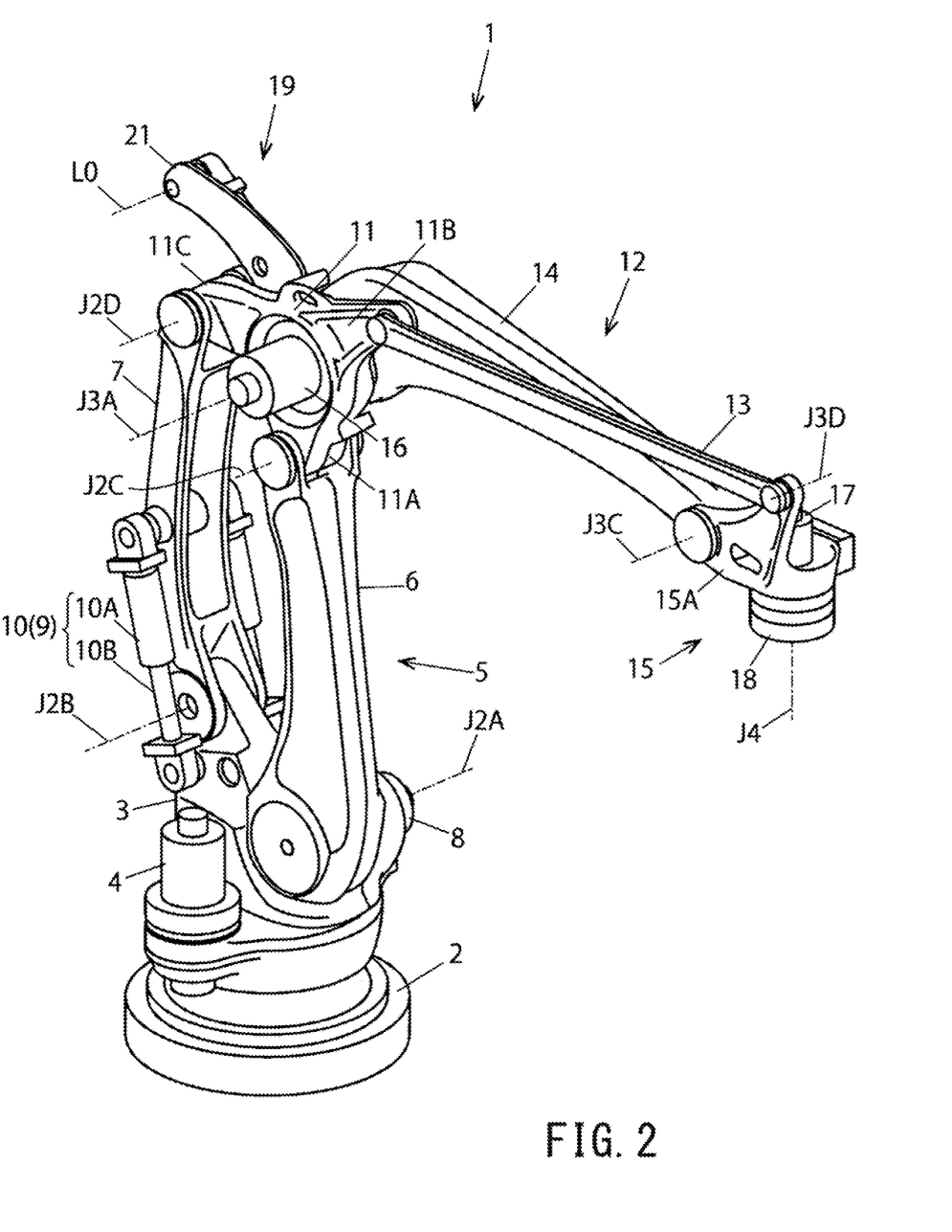
FIG. 2 is a perspective view of the industrial robot in FIG. 1 in a view from the diagonal front.
Figure 3:
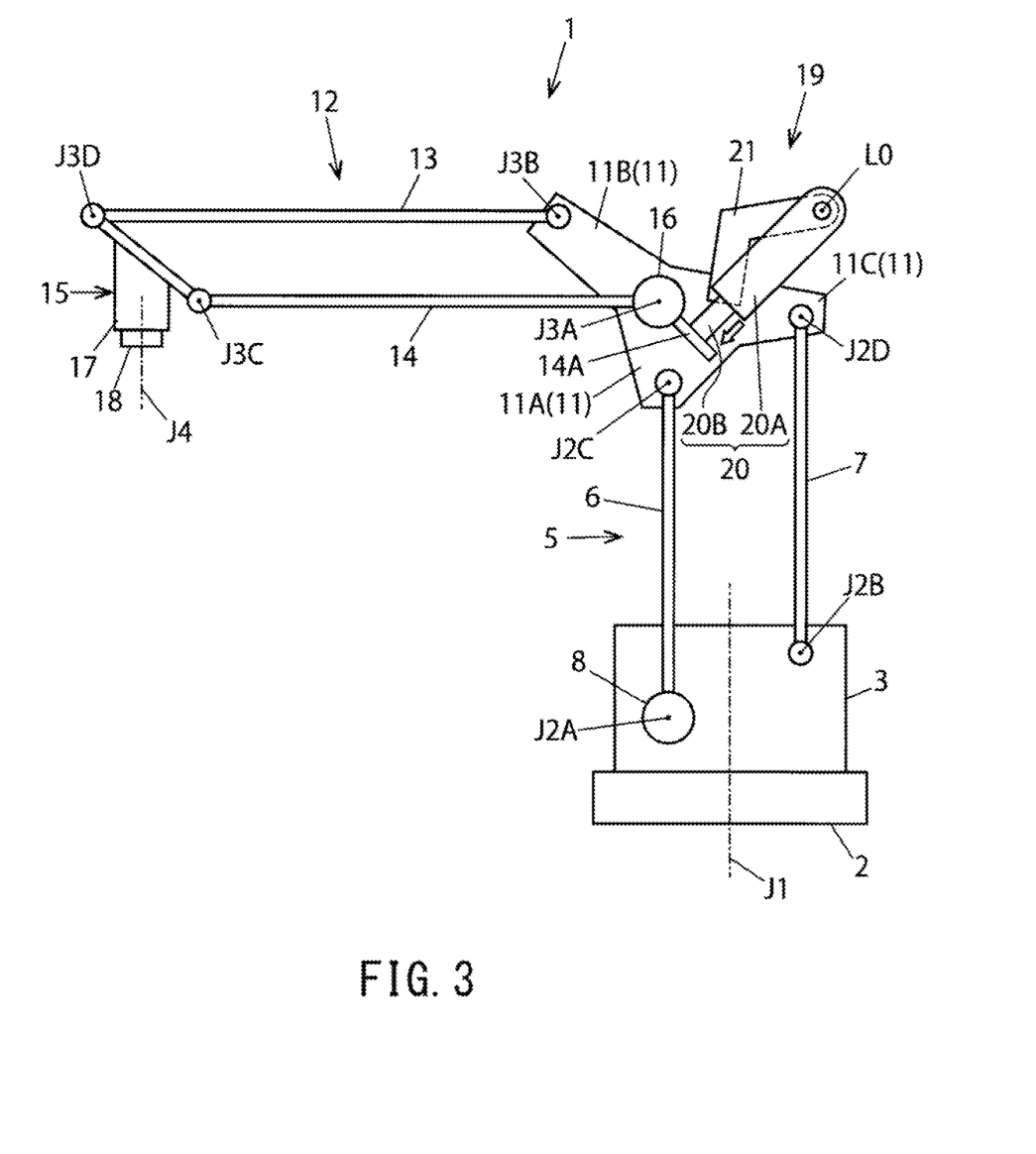
FIG. 3 is a schematic view illustrating a link structure of the industrial robot in FIG. 1.
Figure 7:
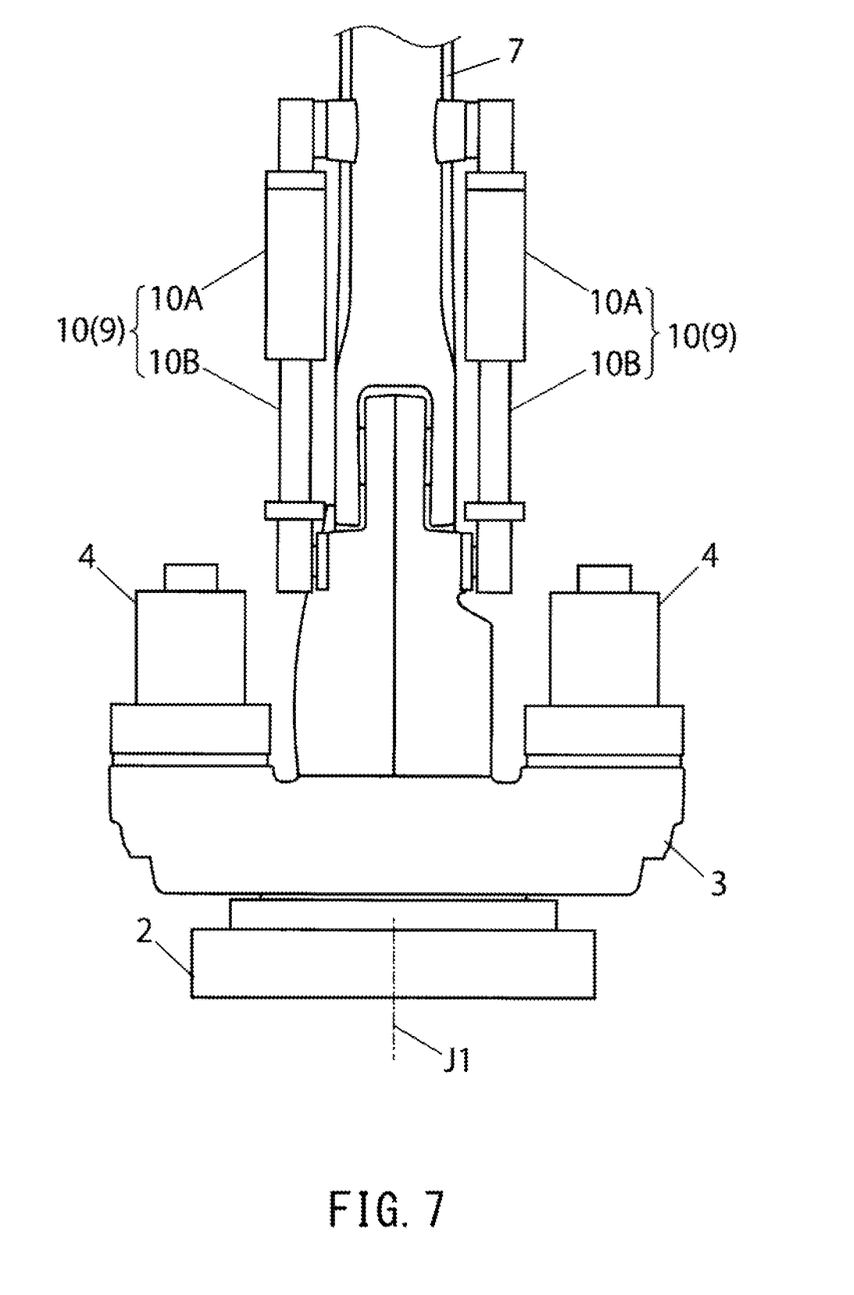
FIG. 7 is a vertical section view of the lower half part of the lower arm mechanism in FIG. 6 in a view from the front.

As illustrated in FIG. 1 to FIG. 3, a robot 1 in accordance with this embodiment has a base 2 installed on a floor surface and a base portion 3 is provided on the base 2. As illustrated in FIG. 3, the base portion 3 is capable of rotating about a vertical axis line J1 with respect to the base 2. As illustrated in FIG. 1 and FIG. 7, a rotational force to the base portion 3 is applied by a pair of servo motors (drive source) 4 arranged on the right and left with the vertical axis line J1 sandwiched.

The robot 1 according to this embodiment comprises a lower arm having a first parallel link structure and a lower side part of the first parallel link structure is formed of the base portion 3.

As illustrated in FIG. 3, the first parallel link structure configuring a lower arm mechanism 5 has a first lower arm 6 configuring its front side part and a second lower arm 7 configuring its rear side part. A lower end of the first lower arm 6 is connected to the base portion 3 so as to rotate about a horizontal axis line J2A. A lower end of a second lower arm 7 is connected to the base portion 3 so as to rotate about a horizontal axis line J2B. As illustrated in FIG. 1, the first lower arm 6 is rotationally driven about the horizontal axis line J2A with respect to the base portion 3 by a servo motor (drive source) 8 provided to the base portion 3.

As illustrated in FIG. 1, FIG. 2, and FIG. 7, the robot 1 further comprises a lower arm biasing unit (balancer) 9 for applying a biasing force against a forward inclining operation of the second lower arm 7 to the second lower arm 7 configuring the rear side part of the first parallel link structure configuring the lower arm mechanism 5. The lower arm biasing unit 9 comprises a pair of right and left gas springs 10. A rear end portion of a cylinder 10A of the gas spring 10 is rotatably connected to the second lower arm 7 and also a tip end portion of a piston 10B of the gas spring 10 is rotatably connected to the base portion 3.

Figure 4:
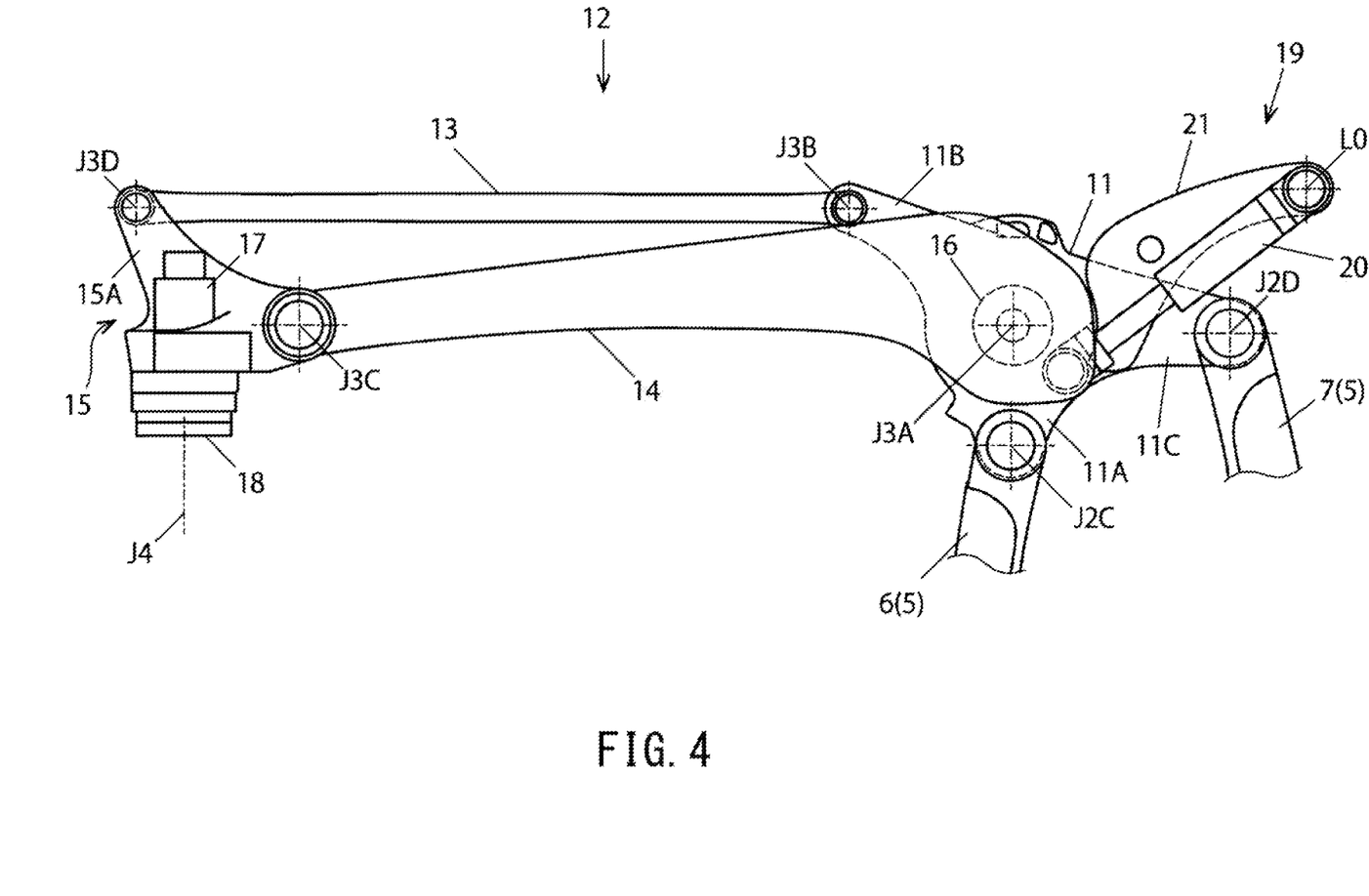
FIG. 4 is an enlarged side view illustrating an upper arm mechanism of the industrial robot in FIG. 1.

As illustrated in FIG. 2 and FIG. 4, an upper side part of the first parallel link structure configuring the lower arm mechanism 5 is configured by an intermediate connection portion 11. The intermediate connection portion 11 comprises a lower protrusion portion 11A, a front projection portion 11B, and a rear projection portion 11C. An upper end portion of the first lower arm 6 is connected to the lower protrusion portion 11A of the intermediate connection portion 11 so as to rotate about a horizontal axis line J2C. An upper end portion of the second lower arm 7 is connected to the rear projection portion 11C of the intermediate connection portion 11 so as to rotate about a horizontal axis line J2D.

As illustrated in FIG. 3, the first parallel link structure is formed with the four horizontal axis lines J2A, J2B, J2C, J2D as the vertexes. When the first lower arm 6 is operated so as to be inclined to the front to the rear by the servo motor 8, the upper side part of the first link structure (the part connecting the horizontal axis line J2C and the horizontal axis line J2D) rocks back and forth while maintaining its inclination. Namely, the intermediate connection portion 11 maintains the same posture regardless of the inclining operation of the lower arm mechanism 5.

As illustrated in FIG. 1 to FIG. 5, the robot 1 further comprises an upper arm mechanism 12 having the second parallel link structure. The upper side part of the second parallel link structure configuring the upper arm mechanism 12 is configured by an arm auxiliary link 13. A proximal end portion of the upper auxiliary link 13 is connected to the front projection portion 11B of the intermediate connection portion 11 so as to rotate about a horizontal axis line J3B. The lower side part of the second parallel link structure configuring the upper arm mechanism 12 is configured by an upper arm 14. A proximal end portion of the upper arm 14 is connected to the center part of the intermediate connection portion 11 so as to rotate about a horizontal axis line J3A.

The distal side portion of the second parallel link structure configuring the upper arm mechanism 12 is configured by a wrist portion 15. Namely, one apex of a supporting member 15A, which is substantially triangle-shaped, of the wrist portion 15 is connected to the tip end portion of the upper arm 14 so as to rotate about the horizontal axis line J3C. Another apex of the supporting member 15A of the wrist portion 15 is connected to the tip end portion of the upper auxiliary link 13 so as to rotate about a horizontal axis line J3D.

Figure 5:
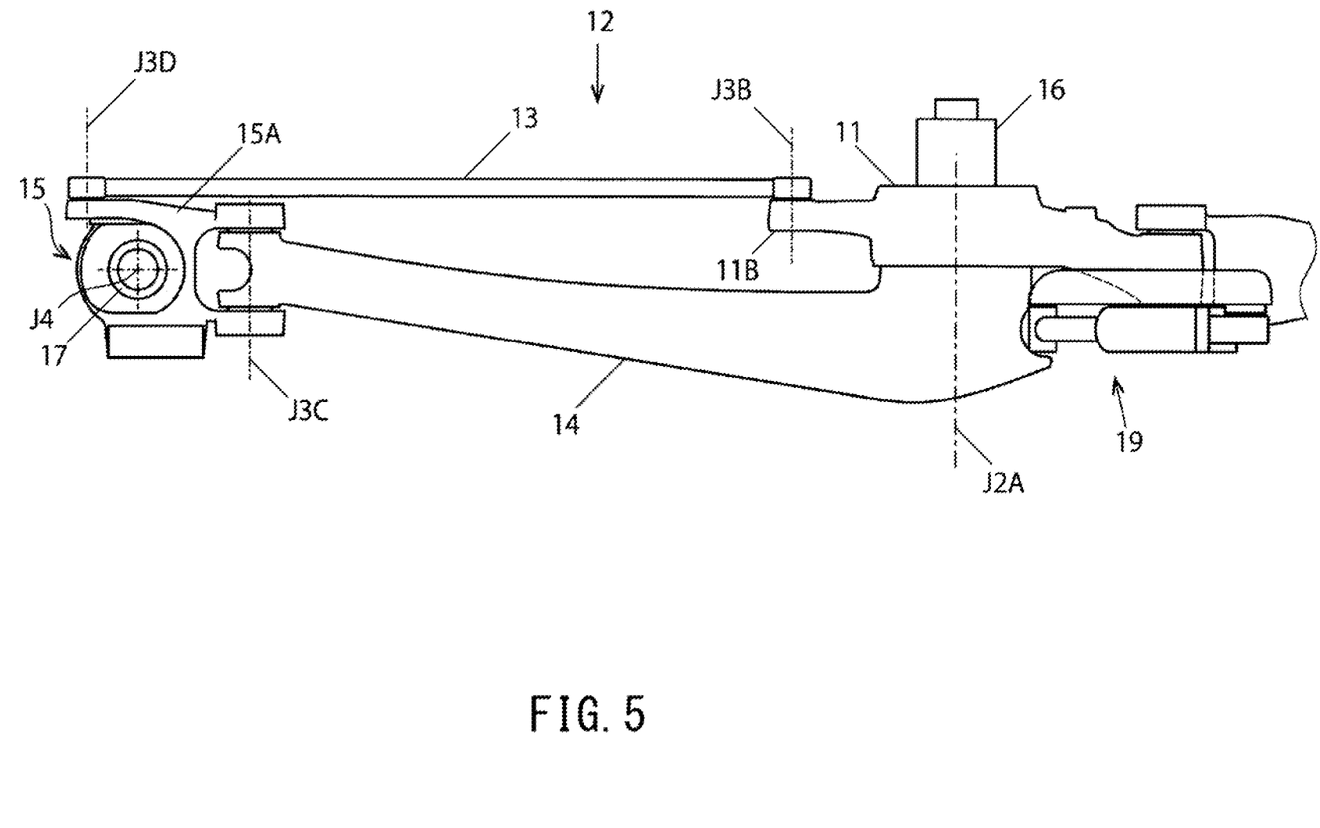
FIG. 5 is a top view of the upper arm mechanism in FIG. 4 cutting away part of the same.

As illustrated in FIG. 5, the upper arm 14 is driven so as to rotate about the horizontal axis line J3A with respect to the intermediate connection portion 11 by a servo motor (drive source) 16 disposed on the intermediate connection portion 11. As illustrated in FIG. 3 and FIG. 4, the second parallel link mechanism is formed with the four horizontal axis lines J3B, J3A, J3C, and J3D as apexes. Therefore, when the upper arm 14 is driven so as to rotate with respect to the intermediate connection portion 11 by the servo motor 16, the wrist portion 15 rocks vertically while maintaining its posture.

A servo motor (drive source) 17 disposed at the supporting member 15A and a rotary body 18 driven so as to rotate about a vertical axis line J4 by the servo motor 17. As described above, the supporting member 15A of the wrist portion 15 rocks vertically while maintaining its inclination. Therefore, the vertical axis line J4 of the rotary body 18 of the wrist portion 15 is always maintained in the vertical direction.

Note that, even when the lower arm mechanism 5 performs a tilting operation, the posture of the upper arm 14 of the upper arm mechanism 12 does not change and also a gravity load to the upper arm 14 does not change, since the lower arm mechanism 5 has a parallel link structure as described above. Namely, even when the lower arm 6 is driven so as to rotate about the horizontal axis line J2A corresponding to the second axis of the robot 1, torque about the horizontal axis line J3A corresponding to the third axis of the robot 1 does not change.

As illustrated in FIG. 1 and FIG. 2, the robot 1 according to this embodiment further includes an upper arm biasing unit (balancer) 19 configured to apply an emerging force against a rotational operation in the direction that the wrist portion 15 descends to the upper arm 14 configuring the lower side part of the second parallel link structure of the upper arm mechanism 12. Note that the upper arm 14 is an arm which is directly driven by the servo motor 16, as described above.

As illustrated in FIG. 3, the upper arm 14 has an arm extension portion 14A extending exceeding the horizontal axis line J3A as a rotational axis line of the upper arm 14 on the proximal end side of the upper arm 14. An upper arm biasing unit 19 is configured to apply a biasing force to the arm extension portion 14A.

The upper arm biasing unit 19 includes a gas spring 20. The rear end portion of a cylinder 20A of the gas spring 20 is connected to one end of a gas spring support 21 the other end of which is fixed to the center connection portion 11 so as to rotate about a horizontal axis line L0. The tip end portion of a piston 20B of the gas spring 20 is connected to the arm extension portion 14A and a biasing force of the gas spring 20 acts in a direction that the arm extension portion 14A is pressed in steadily.

Note that the gas spring support 21 may be connected to the center connection portion 11 after the gas spring support 21 is formed separately from the center connection portion 11 and also the gas spring support 21 may be formed integrally with the center connection portion 11 from the beginning.

The upper arm biasing unit 19 is configured detachably. Namely, the rear end portion of the cylinder 20A of the gas spring 20 is separatably connected to the gas spring support 21, and the tip end portion of the piston 20B of the gas spring 20 is separatably connected to the arm extension portion 14. Thereby, the upper arm biasing unit 19 can be suitably removed as needed.

Note that, although the gas spring support 21 protrudes upward from the intermediate connection portion 11 as illustrated in FIG. 4, the protrusion range of the gas spring support 21 is limited to a range of not making trouble in operation of the robot 1.

Figure 6:
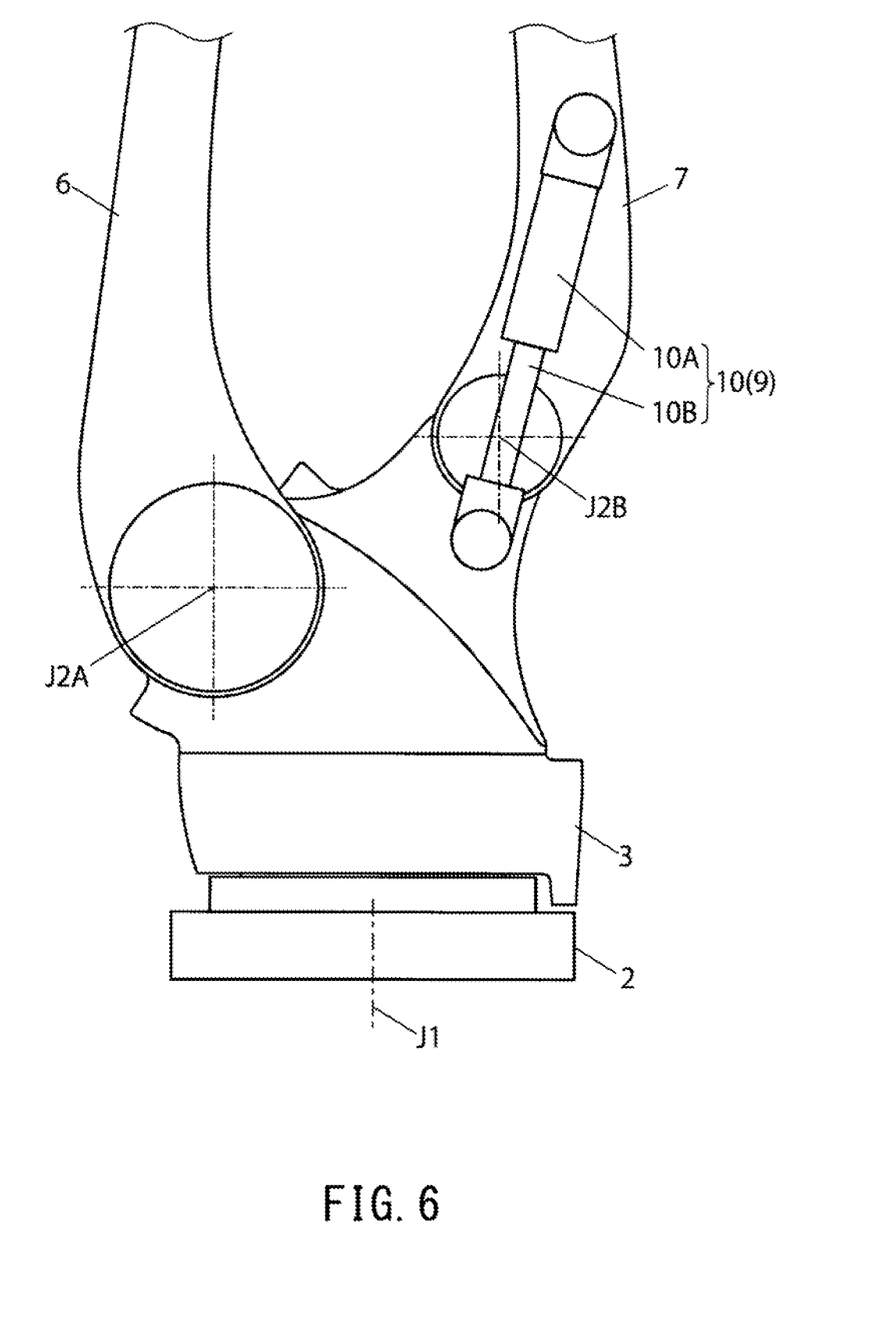
FIG. 6 is an enlarged side view illustrating the lower half part of the lower arm mechanism of the industrial robot in FIG. 1.

In the robot 1 according to this embodiment, the first lower arm 6 and the second lower arm 7 configuring the lower arm mechanism 5 have the same strength against the torsion of the first lower arm 6 and the second lower arm 7. Namely, as illustrated in FIG. 1 and FIG. 6, the first lower arm 6 and the second lower arm 7 are formed of members of substantially equal thickness.

The first lower arm 6 and the second lower arm 7 are formed in a hollow structure with a U-section, respectively. Thereby, the casting performance of the both arms in casting is improved.

Figure 8:
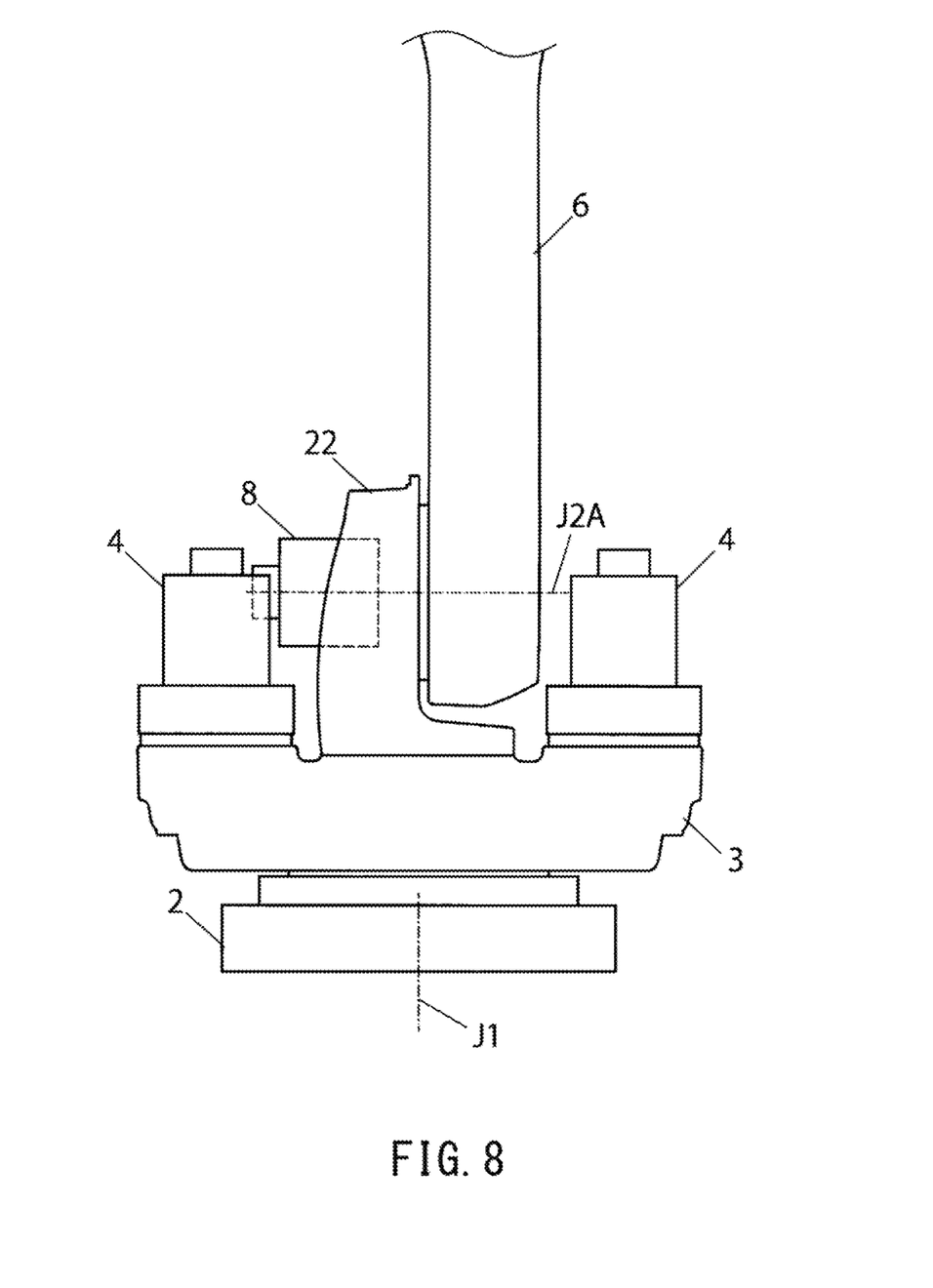
FIG. 8 is a vertical section view of the lower half part of the lower arm mechanism in FIG. 6 in a view from the rear.

As illustrated in FIG. 8, the lower end portion of the first lower arm 6 which is directly driven by the servo motor 8 is connected to the base portion 3 by a single supporting portion 22 to have a cantilever structure. This configuration can be realized easily by forming the first lower arm 6 and the second lower arm 7 with members of substantially equal thickness as described above thereby making the first lower arm 6 thinner than before.

As illustrated in FIG. 1 and FIG. 7, the lower arm biasing unit 9 is configured to apply a biasing force to the second lower arm 7 not to the first lower arm 6 which is directly driven by the servo motor 8. This configuration can be realized easily by forming the first lower arm 6 and the second lower arm 7 with members of substantially equal thickness as described above thereby making the second lower arm 7 thicker than before.

Figure 9:
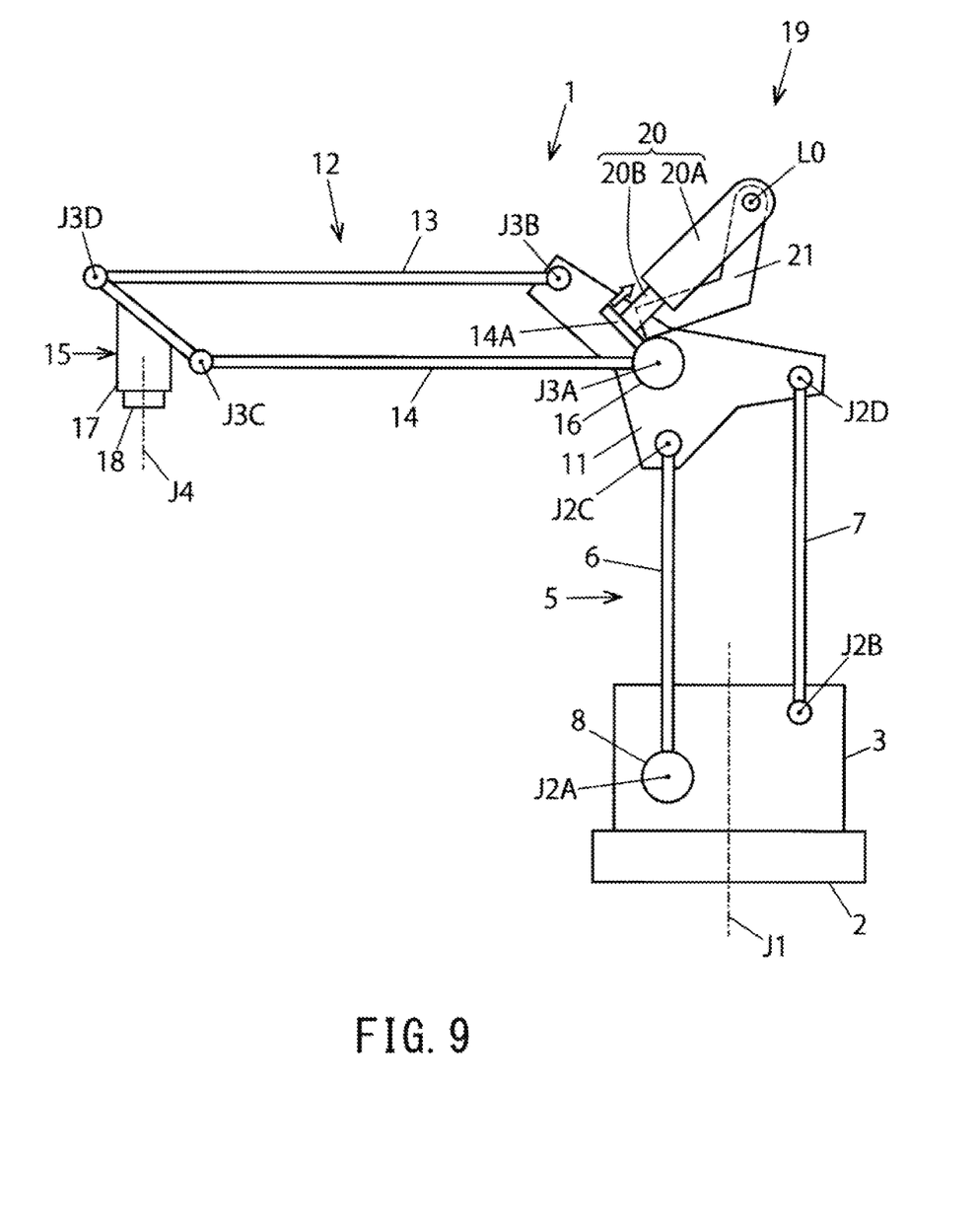
FIG. 9 is a schematic view illustrating a link structure in accordance with a variation of the industrial robot in FIG. 1.

FIG. 9 illustrates a variant example of the embodiment above. In this example, an emerging force of the upper arm biasing unit 19 acts in a direction that the arm extension portion 14A is attracted. Thereby, an emerging force against a rotational operation in a direction that the wrist portion 15 descends is applied to the upper arm 14. Namely, the gas spring 20 of the upper arm biasing unit 19 acts in a direction that the piston 20B of the gas spring 20 is withdrawn.

In another variant example, the lower arm biasing unit 9 can be disposed so as to apply a biasing force to the first lower arm 6 on the front side not to the second lower arm 7 on the rear side.

In another variant example, in the upper arm biasing unit 19, a balancer using a spring or a counterbalance mechanism using a weight can be used instead of the gas spring 20.

According to the embodiment and variant examples thereof above, a biasing force against a rotational operation in a direction that the wrist portion 15 descends is applied to the upper arm 14 by the upper arm biasing unit 19. Therefore, the upper limit of the range of the portable mass of an object can be raised even though the capacity of the servo motor 16 driving the upper arm 14 is increased or the reduction ratio is not increased. Namely, the range of the portable mass of an object can be expanded without enlarging an arm driving motor and decreasing an arm operation speed.

DESCRIPTION OF REFERENCE NUMERALS

1 . . . robot
2 . . . base
3 . . . base portion
4, 8, 16, 17 . . . servo motor (drive source)
5 . . . lower arm mechanism
6 . . . first lower arm
7 . . . second lower arm
9 . . . lower arm biasing unit (balancer)
10, 20 . . . gas spring
10A, 20A . . . cylinder of gas spring
10B, 20B . . . piston of gas spring
11 . . . intermediate connection portion
11A . . . lower protrusion portion of intermediate connection portion
11B . . . front protrusion portion of intermediate connection portion
11C . . . rear protrusion portion of intermediate connection portion
12 . . . upper arm mechanism
13 . . . upper auxiliary link
14 . . . upper arm
14A . . . arm extension portion
15 . . . wrist portion
15A . . . supporting member of wrist portion
18 . . . rotary body
19 . . . upper arm biasing unit (balancer)
21 . . . gas spring support
22 . . . supporting member of first lower arm
J1, J4 . . . vertical axis line
J2A, J2B, J2C, J2D, J3A, J3B, J3C, J3D, L0 . . . horizontal axis line

The invention claimed is:

1. An industrial robot comprising:
a lower arm mechanism having a first parallel link structure;
an upper arm mechanism having a second parallel link structure;
a base portion forming a lower side part of the first parallel link structure, the base portion being configured to rotate about a vertical axis line;
a wrist portion forming a distal side part of the second parallel link structure;
an intermediate connection portion forming an upper side part of the first parallel link structure and a proximal side part of the second parallel link structure, the intermediate connection portion being formed as an integral structure; and
an upper arm biasing unit configured to apply a biasing force against a rotating operation in a direction that the wrist portion descends to an upper arm configuring a lower side part or an upper side part of the second parallel link structure,
wherein the industrial robot is a four axle robot,
wherein the wrist portion is configured to rock vertically while always maintaining a vertical axis in a vertical direction when the upper arm is rotated with respect to the intermediate connection portion,
wherein the upper arm has an arm extension portion that extends from a rotational axis of the upper arm and that exceeds the rotational axis of the upper arm on a proximal end side of the upper arm,
wherein the upper arm biasing unit is configured so as to apply a biasing force to the arm extension portion,
wherein the biasing force of the upper arm biasing unit works in a direction that the arm extension portion is pressed in,
wherein the upper arm biasing unit is positioned rearward with respect to the rotational axis of the upper arm,
wherein the upper arm biasing unit has a gas spring, and
wherein the gas spring has a cylinder connected to an intermediate connection portion side and a piston connected to an arm extension portion side.

2. The industrial robot according to claim 1, wherein the upper arm biasing unit is configured detachably.

3. The industrial robot according to claim 1, wherein the upper arm biasing unit applies a biasing force to the upper arm.

4. The industrial robot according to claim 1, wherein the upper arm to which the biasing force is applied by the upper arm biasing unit is an arm directly driven by a drive source.

5. The industrial robot according to claim 1, wherein the first parallel link structure has a first lower arm configuring a front side part thereof and a second lower arm configuring a rear side part thereof, and
wherein the first lower arm and the second lower arm having a same strength against their torsion.

6. The industrial robot according to claim 5, wherein at least one of the first lower arm and the second lower arm is formed to have a hollow structure.

7. The industrial robot according to claim 5, wherein one of the first lower arm and the second lower arm which is directly driven by a drive source is connected to the base portion so as to have a cantilever structure.

8. The industrial robot according to claim 1, further comprising a lower arm biasing unit configured to apply a biasing force against a forward inclining operation of a lower arm configuring a front side part or a rear side part of the first parallel link structure.

9. The industrial robot according to claim 8, wherein the first parallel link structure has a first lower arm configuring its front side part and a second lower arm configuring its rear side part, and
wherein the lower arm biasing unit applies a biasing force to one of the first lower arm and the second lower arm which is different from either one which is directly driven by a drive source.

10. The industrial robot according to claim 1, wherein the industrial robot having a pair of left and right drive sources configured to apply a rotational drive force to the base portion.

* * * * *